United States Patent
Tvila (10) Patent No.: US 12,111,765 B2
(45) Date of Patent: Oct. 8, 2024

(54) PREFETCH CIRCUIT FOR CACHE MEMORY

(71) Applicant: Cadence Design Systems, Inc., San Jose, CA (US)

(72) Inventor: Avishai Tvila, Gival Shmuel (IL)

(73) Assignee: Cadence Design Systems, Inc., San Jose, CA (US)

( * ) Notice: Subject to any disclaimer, the term of this patent is extended or adjusted under 35 U.S.C. 154(b) by 77 days.

(21) Appl. No.: 17/661,394

(22) Filed: Apr. 29, 2022

(65) Prior Publication Data

US 2023/0350806 A1 Nov. 2, 2023

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC ........ G06F 12/0862; G06F 2212/602
See application file for complete search history.

(56) References Cited

U.S. PATENT DOCUMENTS

| | | | |
|---|---|---|---|
| 9,158,705 B2 | 10/2015 | Topp et al. | |
| 9,817,762 B2 | 11/2017 | Kapil et al. | |
| 2006/0248279 A1 | 11/2006 | Al-Sukhni et al. | |
| 2014/0052927 A1* | 2/2014 | McCauley | G06F 12/0862 711/137 |
| 2014/0281351 A1* | 9/2014 | Topp | G06F 12/1027 711/205 |
| 2015/0026414 A1* | 1/2015 | Kalamatianos | G06F 12/06 711/137 |
| 2015/0356015 A1* | 12/2015 | Sathish | G06F 12/0623 711/119 |
| 2019/0087341 A1* | 3/2019 | Pugsley | G06F 12/0811 |
| 2021/0096995 A1 | 4/2021 | Zheng et al. | |
| 2021/0216461 A1 | 7/2021 | Pusdesris et al. | |

* cited by examiner

*Primary Examiner* — Prasith Thammavong
(74) *Attorney, Agent, or Firm* — Mark H. Whittenberger; Holland & Knight LLP (57) ABSTRACT

A prefetch circuit coupled to a cache memory circuit includes a storage circuit that stores multiple virtual-to-physical address map entries. In response to receiving an indication of a miss for an access request to the cache memory circuit, the prefetch circuit generates a prefetch address and compares it to a demand address included in the access request. In response to determining that the demand address and the prefetch address are in different memory pages, the prefetch circuit generates a prefetch request using physical page information retrieved from the storage circuit.

11 Claims, 7 Drawing Sheets

PREFETCH CIRCUIT FOR CACHE MEMORY

BACKGROUND

Technical Field

This disclosure relates to cache memory accesses in a computer system, and, in particular, to cache memory circuit prefetch operations.

Description of the Related Art

Computer systems include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from, one or more devices included in, or coupled to, the computer system. Such data may also be stored and later retrieved from a memory circuit included in the computer system.

To facilitate the retrieval of program instructions, and the storage of data, computer systems may include multiple memory circuits. Such memory circuits may vary in storage capacity as well as in access time. In some computer systems, memory circuits may be arranged in a hierarchical fashion, with smaller, faster memory circuits (referred to as "cache memories") coupled directly to processor circuits or processor cores. Larger, slower memory circuits (referred to as "main memory") are coupled to the processor circuits or processor cores via a memory management unit and a communication network.

Cache memories may store frequently used program instructions and data, so that a processor may quickly retrieve frequently used program instructions and data without having to wait for an access to main memory. Accesses to main memory can take multiple processing cycles, which can cause a processor circuit or processor core to wait for requested data, resulting in a decrease in performance.

DETAILED DESCRIPTION

Computer systems often employ a hierarchy of memory circuits, with smaller-capacity, higher-performing memory circuits located in close proximity to processor circuits. During operation of a computer system, various memory circuits may store a variety of data relating to operands, instructions, graphics, or other audio and visual data. As data is used in the computer system, it may be moved from long-term storage, e.g., a hard-disk drive, to main memory, to the high-performing memory near the processor circuits.

One particular type of memory circuit employed in a computer system is a cache memory circuit, which is used to store frequently used program instructions and data for a processor circuit. By storing frequently used program instructions and data in a cache memory circuit, a computer system can avoid delays associated with accesses to main memory or external storage devices, thereby improving performance. Stored information in a cache memory circuit is organized in "cache lines" that include multiple bits. In some cases, a cache line may store a single program instruction, an operand, or any other suitable type of data.

In some computer systems, processor circuits in the computer systems access memory resources using virtual addresses. Such virtual addresses are an abstract of the full range of storage available within the computer system. When a processor circuit accesses a portion of the storage available within the computer system, a virtual address corresponding to the portion of the storage is mapped to a corresponding physical address that is used to access the memory circuit(s) corresponding to the portion of the storage.

The virtual address space of a computer system is often organized into pages (or "memory pages"). As used and defined herein, a memory page refers to a block of contiguous virtual memory described by a single entry in a page table that maps virtual addresses to physical addresses in the computer system. Depending on an amount of the storage within a computer system, the page table can be quite large, and the time needed to find a map between a given virtual address and its corresponding physical address can be long, negatively impacting system performance.

To limit the number of times the page table of a computer system is traversed (referred to as a "table walk"), circuits called translation lookaside buffers are employed. A translation lookaside buffer (or "TLB") stores frequently used virtual-to-physical address maps for a corresponding memory circuit. When a memory circuit is accessed, its corresponding TLB is checked for the appropriate virtual-to-physical address map. If the map is available, access to the memory circuit can proceed. If, however, the map is not available in the TLB, a table walk is started to find the appropriate map, while the access to the memory circuit is paused. Once the appropriate map is found in the page table, the map is loaded in the TLB, and the address is translated so that access to the memory circuit can resume.

In some cases, when an access request is sent to a cache memory circuit, the requested instruction or data is not currently stored in the cache memory circuit. This situation is referred to as a "cache miss" and, when it occurs, the cache memory circuit issues a fetch to a next higher-level memory circuit for the requested instruction or data. During the time while the requested instruction or data is retrieved from the higher-level memory, execution of instructions in a processor circuit may be paused until the requested instruction or data is available. Such pauses can reduce the overall performance of a computer system. Once the requested instruction or data is returned to the cache memory circuit from the higher-level memory circuit, the cache memory circuit relays the requested instruction or data to the requesting entity and execution can resume.

To reduce the likelihood of further cache misses, some computer systems include prefetch circuits that, in response to a cache miss, determine an address (referred to as a "prefetch address") that identifies instructions or data likely to be requested in subsequent accesses to a cache memory circuit and prefetches the instructions or data identified by the prefetch address. By prefetching instructions and data into the cache memory circuit in such a fashion, a number of cache misses can be reduced, thereby maintaining system performance.

To generate a prefetch address, an offset is added to a demand address associated with a cache miss. In some cases, the prefetch address may be in a different page of memory than the demand address. When this occurs, the physical page number for the different page of memory is needed to generate a prefetch request. To obtain the physical page number, a translation lookaside buffer, or similar circuit, is accessed. The latency associated with such an access, particularly if the translation lookaside buffer needs to perform a table walk, can be detrimental to the performance of the computer system.

The embodiments illustrated in the drawings and described below provide techniques for generating prefetch requests in response to cache misses in a cache memory circuit. By maintaining a number of virtual-to-physical map entries in a prefetch circuit, the prefetch circuit can rapidly generate prefetch requests without the latency of a translation lookaside buffer access. Moreover, by speculatively updating the virtual-to-physical addresses in the prefetch circuit, accesses to the translation lookaside buffer can be performed in advance, limiting the impact of such accesses on system performance.

Figure 1:
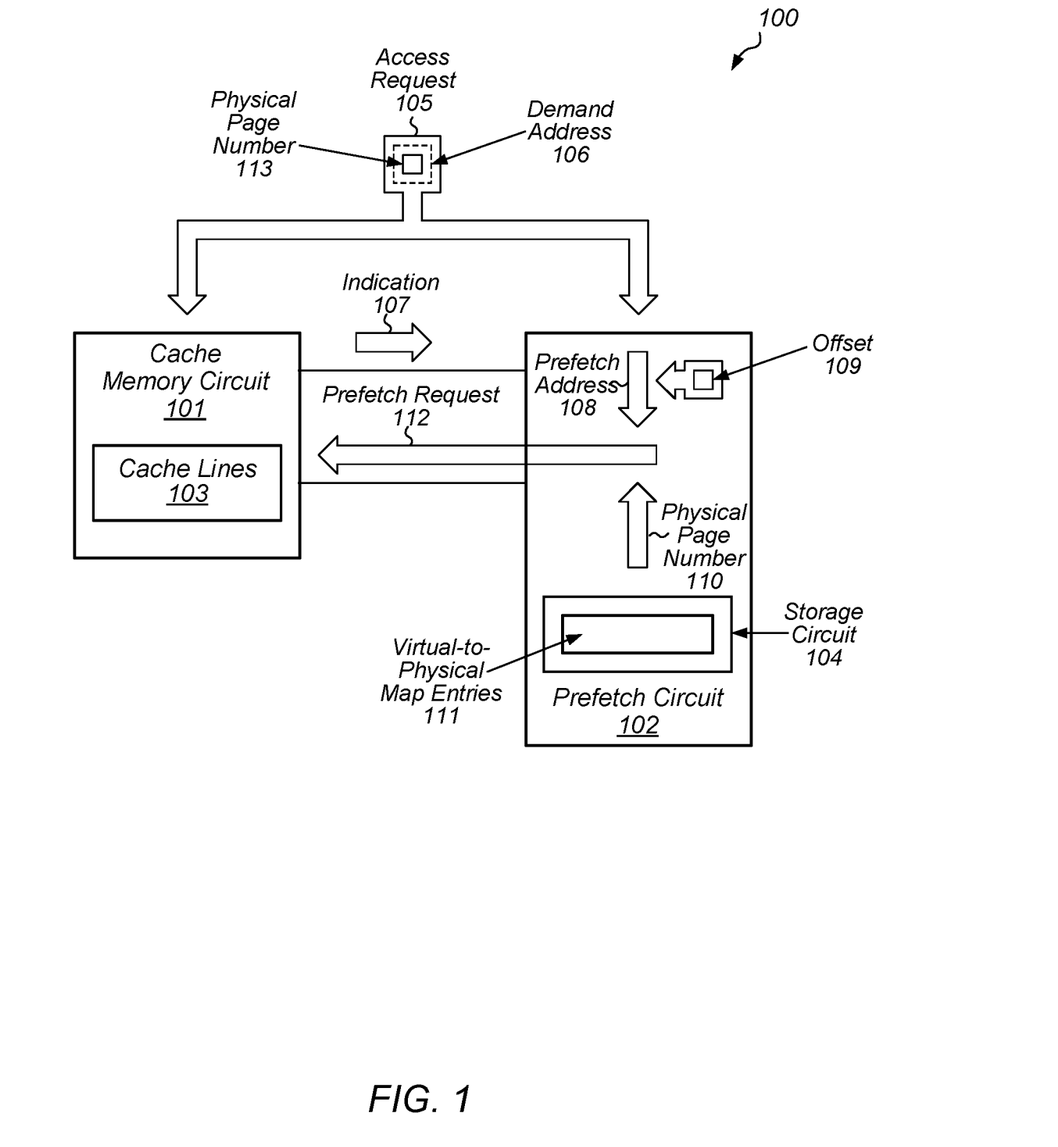
FIG. 1 is a block diagram of an embodiment of a cache prefetch sub-system.

Turning now to FIG. 1, a block diagram of a cache subsystem is depicted. As illustrated, cache subsystem 100 includes cache memory circuit 101 and prefetch circuit 102, which includes storage circuit 104. It is noted that cache subsystem 100 can be employed at various places within a memory hierarchy of a computer system.

Cache memory circuit 101 is configured to store cache lines 103. In various embodiments, cache lines 103 may be associated with a corresponding plurality of addresses. Cache memory circuit 101 is also configured to receive access request 105, which includes demand address 106. In various embodiments, demand address 106 identifies data included in a particular memory page identified by physical page number 113.

Upon receiving access request 105, cache memory circuit 101 may be further configured to check cache lines 103 for the data identified by demand address 106. If the data identified by demand address 106 is included in cache lines 103, cache memory circuit 101 is configured to return the requested data to the entity (e.g., a processor circuit) that generated access request 105. Alternatively, if the data identified by demand address 106 is not included in cache lines 103, cache memory circuit 101 is configured to generate indication 107, which is an indication of a "cache miss." In some cases, cache memory circuit 101 is also configured, in response to the determination that the data identified by demand address 106 is not stored in cache lines 103, to generate a fetch request to a higher-level memory circuit for the data identified by demand address 106. In various embodiments, cache memory circuit 101 may be implemented using a static random-access memory (SRAM) circuit or any other suitable data storage circuit.

In order to minimize the likelihood of another miss, prefetch circuit 102 is configured, in response to receiving indication 107 from cache memory circuit 101, to generate prefetch request 112 using demand address 106. By prefetching additional program instructions and/or data, cache memory circuit 101 can be preloaded with program instructions and data that are likely to be requested after access request 105.

Prefetch circuit 102 is configured to generate prefetch address 108 using demand address 106 and offset 109. As described below, prefetch circuit 102 may be configured to determine a value for offset 109 during a training or learning operation during which addresses from previous cache misses are analyzed. In some cases, a most-significant-bit (MSB) of prefetch address 108 may be determined from demand address 106 or from an entry in storage circuit 104 based on an indication of whether a memory page boundary has been crossed.

Storage circuit 104 is configured to store virtual-to-physical map entries 111, which may be used to map a virtual page number to a physical page number. In various embodiments, storage circuit 104 may be configured to store any suitable number of virtual-to-physical map entries and may be implemented using a register file, an SRAM circuit, or any other suitable data storage circuit.

Prefetch circuit 102 may perform different operations based on whether or not demand address 106 and prefetch address 108 are in a same memory page or different memory pages. For example, in response to receiving indication 107 from cache memory circuit 101, prefetch circuit 102 is configured to generate prefetch request 112 using physical page number 110 in response to a determination that the prefetch address is not included in the particular memory page identified by physical page number 113.

Prefetch circuit 102 is further configured, in response to receiving indication 107, to generate prefetch request 112 using offset 109, demand address 106, and physical page number 113 in response to a determination that prefetch address 108 is included in the particular memory page identified by physical page number 113.

As described below, cache memory circuit 101 and prefetch circuit 102 may be coupled to a translation lookaside buffer circuit configured to store a plurality of entries that map virtual page numbers to physical page numbers. Prefetch circuit 102 is further configured, in response to the determination that prefetch address 108 and demand address 106 are both included in the particular memory page identified by physical page number 113, and in response to a determination that a cross page mode is active, to send a request to the translation lookaside buffer for a particular entry stored in the translation lookaside buffer that includes a next physical page number in response to a determination that the next physical page number is not stored in storage circuit 104. It is noted that the request is sent to the translation lookaside buffer even if it the first access to demand address 106.

In some embodiments, prefetch circuit 102 is configured to increment physical page number 113 to generate the next physical page number. In other embodiments, prefetch circuit 102 is configured to decrement physical page number 113 to generate the next physical page number. As described below, a determination of whether to increment or decrement physical page number 113 may be based on a result from combining demand address 106 and offset 109.

Figure 2:
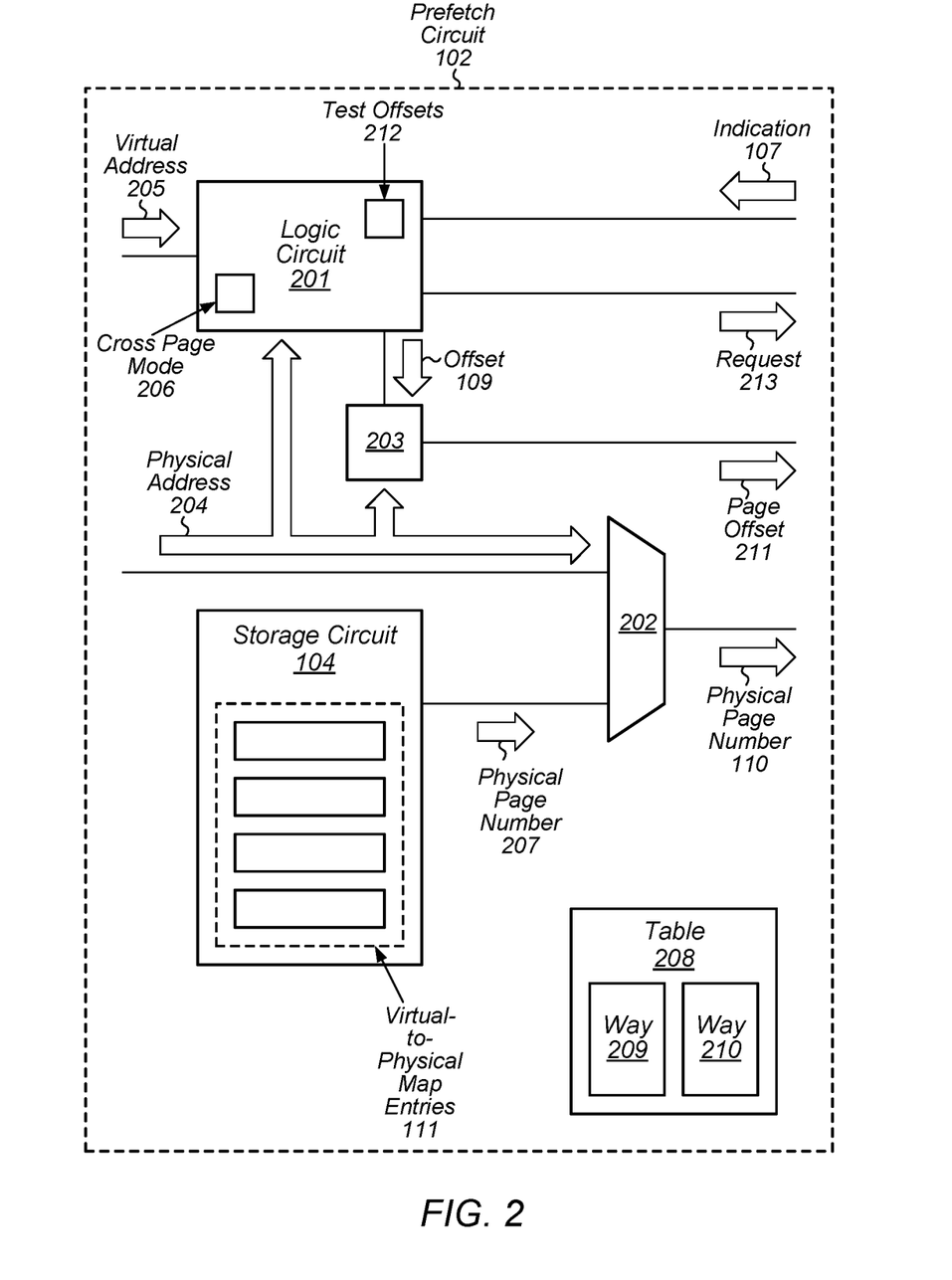
FIG. 2 is a block diagram of an embodiment of a prefetch circuit.

Turning to FIG. 2, a block diagram of an embodiment of prefetch circuit 102 is depicted. As illustrated, prefetch circuit 102 includes logic circuit 201, multiplex circuit 202, adder circuit 203, storage circuit 104, and table 208.

Logic circuit 201 is configured to receive virtual address 205 and physical address 204. In various embodiments, virtual address 205 and physical address 204 may correspond to a same location in memory and may be included as part of access request 105. In various embodiments, logic circuit 201 is configured to determine whether demand address 106 and prefetch address 108 are in a same memory page or in different memory pages. As described above, logic circuit 201 may also be configured to update virtual-to-physical map entries 111 by generating request 213 which requests new virtual-to-physical map entries from a translation lookaside buffer circuit. Logic circuit 201 may be implemented using a microcontroller, a state machine, or any other suitable combination of combinatorial and sequential logic circuits In addition to managing the storage of virtual-to-physical map entries 111 and the generation of prefetch request 112, logic circuit 201 is also configured to periodically perform a training (or "learning") operation during which a value of offset 109 is determined and whether or not cross page mode 206 is enabled or disabled.

During the training operation, and in response to receiving an indication of a cache miss, i.e., indication 107, logic circuit 201 is configured to store data associated with the cache miss in table 208. As described below, logic circuit 201 may store different information in each of ways 209 and 210. Logic circuit 201 is further configured to select a particular test offset of test offsets 212 and increase a score associated with the particular offset included in test offsets 212 in response to a determination that the particular test offset is stored in table 208. Upon completion of the training operation, logic circuit 201 is configured to select a value of offset 109 using the respective scores of test offsets 212. In various embodiments, logic circuit 201 may be configured to select a given test offset of test offsets 212 that has a highest score. By testing multiple different test offsets and scoring them based on cache misses, logic circuit 201 can determine a "best" offset for prefetches that increases the probability of loading, during prefetches, cache memory circuit 101 with data that is likely to be accessed, thereby decreasing the chance of a cache miss.

Logic circuit 201 is also configured to increment a cross page count in response to a determination that demand address 106 and the prefetch address associated with the cache miss are included in different memory pages. Depending on the nature of software or applications being executed by a processor circuit, prefetches may cross page boundaries more or less often. By tracking the number of page boundary crossings during the training operation, logic circuit 201 can determine if prefetching virtual-to-physical entries and storing them in storage circuit 104 would be beneficial. Upon completion of the training operation, logic circuit 201 is configured to activate cross page mode 206 in response to a determination that the cross page count exceeds a threshold value. It is noted that, in various embodiments, the threshold value may be programmable based on types of software or applications being executed by a processor circuit.

Logic circuit 201 may activate the training operation in variety of ways. In some embodiments, logic circuit 201 may activate the training operation in response to a determination that a particular period of time has elapsed since a previous training operation was performed. In other embodiments, logic circuit 201 may activate the training operation in response to the activation of a training signal (not shown). Such a training signal may be activated in response to changing a software program or application being executed by a processor circuit or any other suitable condition.

As used herein, when a signal is activated, it is set to a logic or voltage level that activates a load circuit or device. The logic level may be either a high logic level or a low logic level depending on the load circuit. For example, an active state of a signal coupled to a p-channel metal-oxide semiconductor field-effect transistor (MOSFET) is a low logic level (referred to as an "active low signal"), while an active state of a signal coupled to an n-channel MOSFET is a high logic level (referred to as an "active high signal").

Logic circuit 201 may be configured to end the training operation using a variety of conditions. In some embodiments, logic circuit 201 is configured to end the training operation in response to a determination that test offsets 212 have been checked a threshold number of times. Alternatively, logic circuit 201 may be configured to end the training operation in response to a determination that a number of times a particular test offset of the plurality of test offsets has been checked exceeds a threshold value.

Adder circuit 203 is configured to generate page offset 211 using offset 109 and physical address 204. To generate page offset 211, adder circuit 203 may be configured to add offset 109 to physical address 204. In some embodiments, a carry output from adder circuit 203 may be used to determine if a next physical page is greater than or less than the current physical page in order for logic circuit 201 to select physical page number 207 from storage circuit 104. In various embodiments, the size of the operands for adder circuit may be based on the base-2 logarithm of the page size (e.g., $\log_2(\text{page size})+1$). In some cases, a carry out bit from adder circuit 203 may be used as an indication that a memory page boundary has been crossed. Adder circuit 203 may be implemented using a full-adder circuit, a ripple-carry adder circuit, or any other suitable type of adder circuit.

In various embodiments, page offset 211 may be included with physical page number 110 in prefetch request 112. As described above, a physical page number (e.g., physical page number 110) may be included in the most-significant-bits of a physical address while page offset 211 may correspond to a difference (or "offset") from the start of a memory page identified by the physical page number to the location within the memory page of desired data. Physical page number 110 and page offset 211 may be combined, in various embodiments, to generate a complete physical address for prefetch request 112.

As described above, storage circuit 104 is configured to store virtual-to-physical map entries 111. Although only four entries are depicted in the embodiment of FIG. 2, in other embodiments, any suitable number of virtual-to-physical map entries may be stored in storage circuit 104. In some cases, the number of virtual-to-physical map entries stored in storage circuit 104 may be increased to improve the likelihood of storage circuit 104 having a needed physical page number for a corresponding virtual page number received as part of an access to cache memory circuit 101. Such an increase in the number of entries may result in an increase in power consumption of prefetch circuit 102 as well as an increase the physical size of prefetch circuit 102. In some embodiments, virtual-to-physical map entries 111 may be accessed using corresponding tags. In such cases, the tag of a next page can be determined using the current virtual page number and an indication of the whether the next page is to be incremented or decremented. In such situations, the aforementioned information can be used to access storage circuit 104 and there is no need to compute the incremented or decremented next page value.

Multiplex circuit 202 is configured to generate physical page number 110 using physical address 204 and physical page number 207. In various embodiments, to generate physical page number 110, multiplex circuit 202 may be configured to select either physical address 204 or physical page number 207 based on whether cross page mode 206 is enabled or disabled, and whether demand address 106 is included in a same memory page as prefetch address 108. For example, if cross page mode 206 is enabled and prefetch address 108 is not included in the same memory page as demand address 106, multiplex circuit 202 is configured to generate physical page number 110 by selecting physical page number 207 retrieved from storage circuit 104.

In various embodiments, multiplex circuit 202 may be implemented using any suitable combination of logic gates. Alternatively, multiplex circuit 202 may be implemented using multiple pass gate circuits coupled together in a wired-OR fashion.

Table 208 is used during the training or learning operation and includes way 209 and way 210 and is configured to store data associated with a cache miss indicated by indication 107. In various embodiments, way 209 is configured to store multiple demand addresses associated with multiple cache misses, and way 210 is configured to store multiple prefetch addresses associated with the multiple cache misses. It is noted that, in various embodiments, the demand addresses stored in way 209 may be virtual addresses, i.e., such addresses are included in the virtual address space for a computer system. In various embodiments, table 208 may be implemented using an SRAM circuit, register file circuit, or any other suitable data storage circuit.

Figure 3:
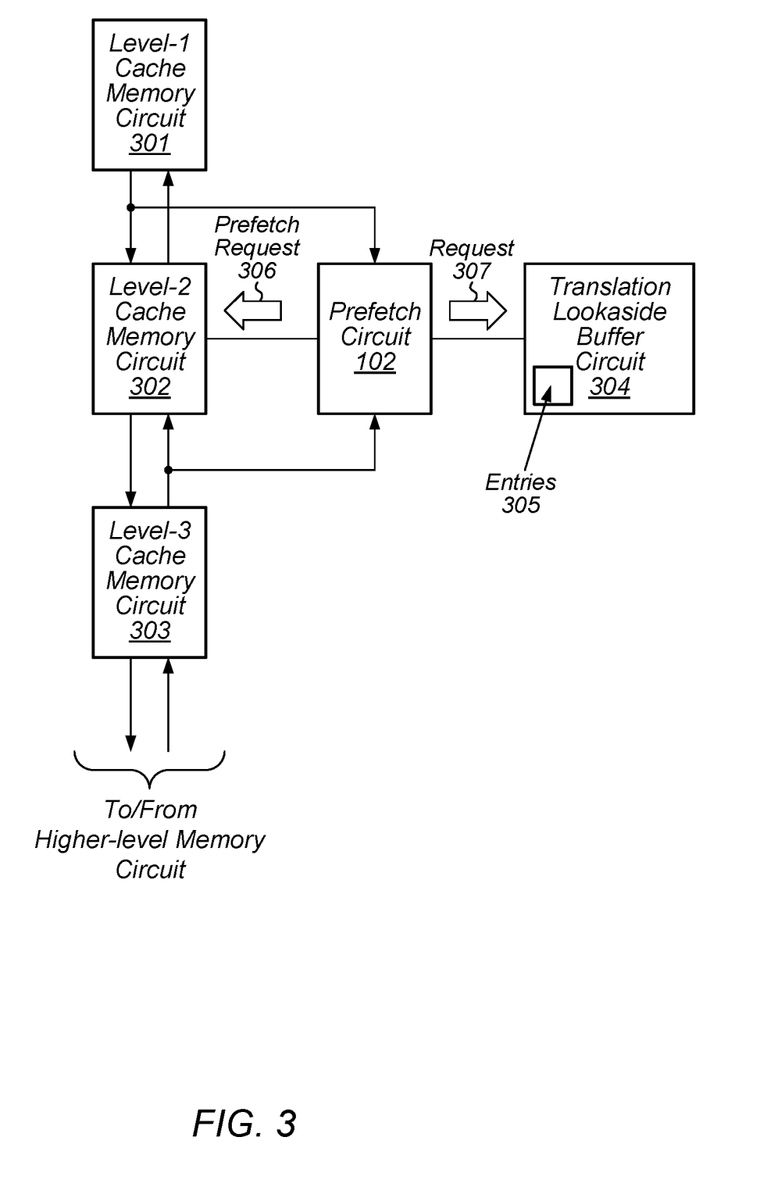
FIG. 3 is a block diagram of an embodiment of a prefetch circuit coupled to a hierarchy of memory circuits.

A block diagram depicting an embodiment of a prefetch circuit coupled to a hierarchy of memory circuits is depicted in FIG. 3. As illustrated, the block diagram of FIG. 3 includes level-1 cache memory circuit 301, level-2 cache memory circuit 302, level-3 cache memory circuit 303, prefetch circuit 102, and translation lookaside buffer circuit 304.

Level-1 cache memory circuit 301 is configured to store a plurality of cache lines. In various embodiments, the plurality of cache lines include frequently used program instructions or data used by a processor circuit (not shown). Level-1 cache memory circuit 301 is also configured, in response to a determination that it is not storing a requested program instruction or a requested portion of data to issue a request (also referred to as a "fetch") for the requested program instruction or the requested portion of data to level-2 cache memory circuit 302.

As described below, level-1 cache memory circuit 301 may include an instruction cache configured to store frequently used program instructions, and a data cache configured to store frequently used data. In various embodiments, level-1 cache memory circuit 301 may be implemented using a static random-access memory (SRAM) circuit, or any other suitable data storage circuit.

Level-2 cache memory circuit 302 is also configured to store a plurality of cache lines. In various embodiments, level-2 cache memory circuit 302 may have a larger storage capacity than level-1 cache memory circuit 301, and be configured to store both frequently used instructions and data, some of which may also be stored in level-1 cache memory circuit 301. In response to a cache miss for a particular program instruction or a particular portion of data, level-2 cache memory circuit 302 is configured to generate a fetch request to level-3 cache memory circuit 303. Additionally, level-2 cache memory circuit 302 may relay prefetch request 306 from prefetch circuit 102 to level-3 cache memory circuit 303. By prefetching program instructions or data in response to a cache miss, system latency may be reduced by having possible requested program instructions and data already stored in level-2 cache memory circuit 302. In various embodiments, level-2 cache memory circuit 302 may be implemented using an SRAM circuit or any other suitable data storage circuit.

As described above, prefetch circuit 102 is configured to generate prefetch request 306 in response to a determination that a cache miss has occurred in level-2 cache memory circuit 302 in response to a request from level-1 cache memory circuit 301. It is noted that, in some embodiments, prefetch request 306 may correspond to prefetch request 112 as depicted in FIG. 1. In various embodiments, prefetch circuit 102 may be configured to include physical page number information generated from virtual-to-physical information stored in prefetch circuit 102 in prefetch request 306. As described above, prefetch circuit 102 may also be configured to send request 307 to translation lookaside buffer circuit 304 for updated virtual-to-physical information. It is noted that, in various embodiments, request 307 may correspond to request 213 as depicted in FIG. 2.

Level-3 cache memory circuit 303 is configured to store a different plurality of cache lines that may include program instructions or data. In some cases, level-3 cache memory circuit 303 may have a larger storage capacity than level-2 cache memory circuit 302. In cases where level-3 cache memory circuit 303 is not storing a requested program instruction or a requested portion of data, level-3 cache memory circuit 303 may issue a fetch for the requested program instruction or the requested portion of data to a higher-level memory circuit. In some embodiments, the higher-level memory circuit may be part of main memory of a computer system while, in other embodiments, the higher-level memory circuit may be another cache memory circuit. In various embodiments, level-3 cache memory circuit 303 may be implemented using an SRAM circuit or any other suitable data storage circuit.

Translation lookaside buffer circuit 304 is configured to store entries 305, each of which map a given virtual page number to a corresponding physical page number. Translation lookaside buffer circuit 304 may, in other embodiments, respond to requests from prefetch circuit 102 for various entries that include requested physical page numbers. In some cases, translation lookaside buffer circuit 304 may also be used by instruction fetch circuits or load store circuits within a processor circuit to translate a virtual address to a physical address in order to access level-1 cache memory circuit 301. Translation lookaside buffer circuit 304 may, in some embodiments, include a dedicated port for receiving requests from prefetch circuit 102, and may be configured to arbitrate among requests from prefetch circuit 102, instruction circuits, and load store circuits.

It is noted that the memory hierarchy depicted in FIG. 3 is merely an example. In other embodiments, different numbers of cache memory circuits may be included between a processor circuit and main memory circuits.

Figure 4:
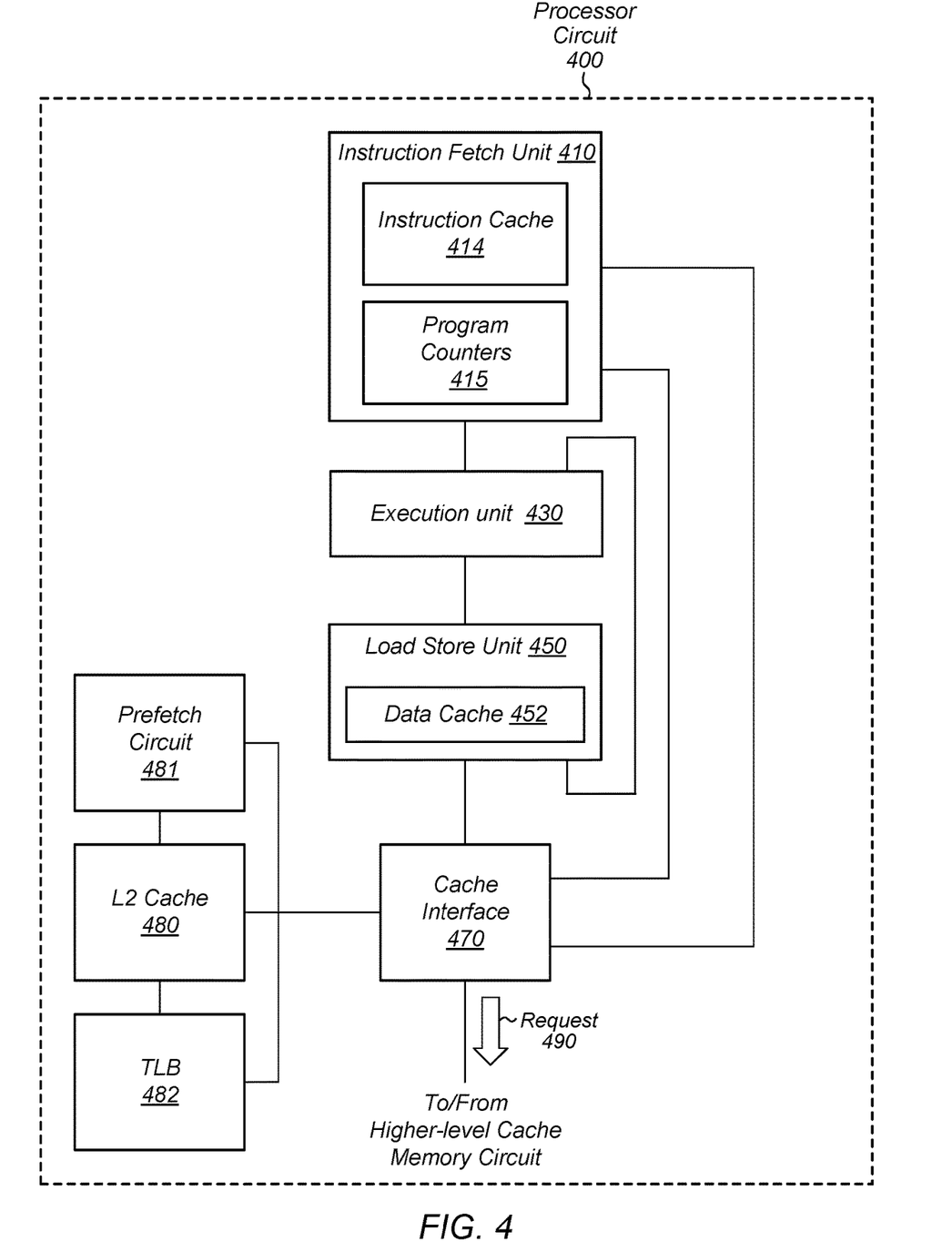
FIG. 4 is a block diagram of an embodiment of a processor circuit.

Turning to FIG. 4, a block diagram of a processor circuit is depicted. As illustrated, processor circuit 400 includes instruction fetch unit 410, execution unit 430, load store unit 450, cache interface 470, L2 cache 480, prefetch circuit 481, and a translation lookaside buffer (denoted as "TLB 482").

Instruction fetch unit 410 is coupled to cache interface 470. In various embodiments, instruction fetch unit 410 is configured to perform various operations relating to the fetching of instructions from a cache or memory circuit via cache interface 470, the selection of instructions from various threads of execution, and the decoding of such instructions prior to issuing the instructions to various functional units for execution. As illustrated, instruction fetch unit 410 includes instruction cache 414 and program counters 415. It is noted that, in some cases, instruction cache 414 may be included in a level-1 cache memory circuit such as level-1 cache memory circuit 301 as depicted in FIG. 3.

In some embodiments, program counters 415 are configured to generate multiple values corresponding to addresses of instructions to be fetched for respective threads being executed by processor circuit 400. Program counters 415 may be implemented using one or more sequential logic circuits configured to generate such address values.

Execution unit 430 is configured to execute and provide results for certain types of instructions issued from instruction fetch unit 410. In some embodiments, execution unit 430 may be configured to execute certain integer-type instructions defined in the implemented instruction set architecture. It is noted that although only a single execution unit is depicted in the embodiment of FIG. 4, in other embodiments, multiple execution units may be employed.

Load store unit 450 is configured to process data memory references, such as integer and floating-point load and store instructions. In some embodiments, load store unit 450 may be further configured to assist in the processing of instruction cache 414 misses originating from instruction fetch unit 410. As illustrated, load store unit 450 includes data cache 452 in addition to a logic circuit configured to detect cache misses and, in response to such misses, request data from L2 cache 480 or a higher-level cache memory via cache interface 470.

In various embodiments, data cache 452 may be implemented as a write-through cache, in which all writes (or "stores") to data cache 452 are written to a higher-level cache memory regardless of whether the stores hit in data cache 452. In some cases, writes that miss in data cache 452 can result in an allocation within data cache 452 that can be used for storing the data. In some cases, data cache 452 may be included as part of a level-1 cache memory circuit, such as level-1 cache memory circuit 301 as depicted in FIG. 3.

L2 cache 480 is configured to store (or "cache") frequently used instructions and data for use by execution unit 430. In various embodiments, L2 cache 480 may be implemented using multiple banks that can be independently accessed using corresponding addresses. Such banks may be implemented using set-associative or direct-mapped techniques.

Cache interface 470 is configured to relay requests (e.g., request 490) from data cache 452 and L2 cache 480 to higher-level cache memory circuits. In response to a determination that requested data is unavailable from the higher-level cache memory circuits, cache interface 470 may relay the data request to system memory or other storage. Cache interface 470 may, in various embodiments, be implemented using a state machine or other sequential logic circuit, a microcontroller, or any other suitable logic circuit.

Prefetch circuit 481 may, in various embodiments, correspond to prefetch circuit 102 and may be configured to generate prefetch request 112 for L2 cache 480 in response to receiving a notification of a cache miss from L2 cache 480. As described above, prefetch circuit 481 may be configured to maintain a set of virtual-to-physical map entries that can be used to generate a new physical page number in response to a cache miss when a demand address and determined prefetch address are located in different memory pages.

TLB 482 may, in various embodiments, correspond to translation lookaside buffer circuit 304 as depicted in FIG. 3. In some embodiments, TLB 482 may be configured to store multiple entries, each of which map a given virtual page number to a corresponding physical page number. TLB 482 may, in other embodiments, respond to requests from prefetch circuit 481 for various entries that include requested physical page numbers. In some cases, TLB 482 may also be used by instruction fetch unit 410 and load store unit 450 to translate a virtual address to a physical address for instruction cache 414 and data cache 452. In some embodiments, TLB 482 may speculatively perform a table walk to update the portion of the virtual-to-physical map it stores. In such cases, TLB 482 may not generate page fault exceptions (or simply "exceptions") when there is not a valid entry in the page table for a particular virtual address.

To summarize, various embodiments of a cache memory subsystem are disclosed. Broadly speaking, an apparatus is contemplated in which a cache memory circuit is configured to store a plurality of cache lines associated with a corresponding plurality of addresses, and receive an access request that includes a demand address corresponding to data included in a particular memory page identified by a particular physical page number. A prefetch circuit that includes a storage circuit configured to store a plurality of virtual-to-physical map entries is configured to generate a prefetch address using the demand address and an offset and, in response to receiving an indication from the cache memory circuit that a particular line is not stored in the cache memory circuit, generate a prefetch request using a different physical page number in response to a determination that the prefetch address is not included in the particular memory page.

In some embodiments, the prefetch circuit is further configured, in response to receiving the indication, to generate the prefetch request using the page offset and the first physical page number in response to a determination that the prefetch address is included in the particular memory page.

In various embodiments, the prefetch circuit is further configured to perform a training operation using a plurality of virtual addresses corresponding to physical addresses included in a plurality of accesses to the cache memory circuit. In response to a determination that a number of times a memory page boundary was crossed during the training operation exceeds a threshold value, the prefetch circuit is configured to, activate a cross page mode, and update the offset using a result of the training operation.

In other embodiments, the apparatus also includes a translation lookaside buffer circuit configured to store a plurality of entries including a given entry that maps a given virtual page number to a given physical page number. In such cases, the prefetch circuit is further configured, in response to the determination that the prefetch address and the demand address are both included in the particular memory page and, in response to a determination that the cross page mode is active, to send a request to the translation lookaside buffer for a particular entry of the plurality of entries that includes the next physical page number in response to a determination that a next physical page number is not stored in the storage circuit.

In some embodiments, the prefetch circuit is further configured to increment the particular physical page number to generate the different physical page number. In other embodiments, the prefetch circuit is further configured to decrement the particular physical page number to generate the different physical page number.

During the training operation, the prefetch circuit is configured, in response to receiving an indication of a cache miss from the cache memory circuit, to store data associated with the cache miss in a table, select a particular test offset from a plurality of test offsets, increase a score associated with the particular test offset in response to a determination that the particular test offset is stored in the table, and increment a cross page count in response to a determination that a demand address and a prefetch address are associated with the cache miss. In various embodiments, the table includes a first way and a second way, where the first way is configured to store a plurality of virtual demand addresses associated with a plurality of cache misses, and the second way is configured to store a plurality of prefetch addresses associated with the plurality of cache misses. In some embodiments, the prefetch circuit is further configured to initialize corresponding scores of the plurality of test offsets in response to the activation of the training operation.

Once the training operation has concluded, the prefetch circuit is configured to select a value for an offset using the respective scores of the plurality of test offsets, and activate the cross page mode in response to a determination that the cross page count exceeds a threshold value. In some embodiments, the prefetch circuit is further configured to end the training operation in response to a determination that the plurality of test offsets have been checked a threshold number of times. In other embodiments, the prefetch circuit is further configured to end the training operation in response to a determination that a particular test offset of the plurality of test offsets has been checked a threshold number of times.

Figure 5:
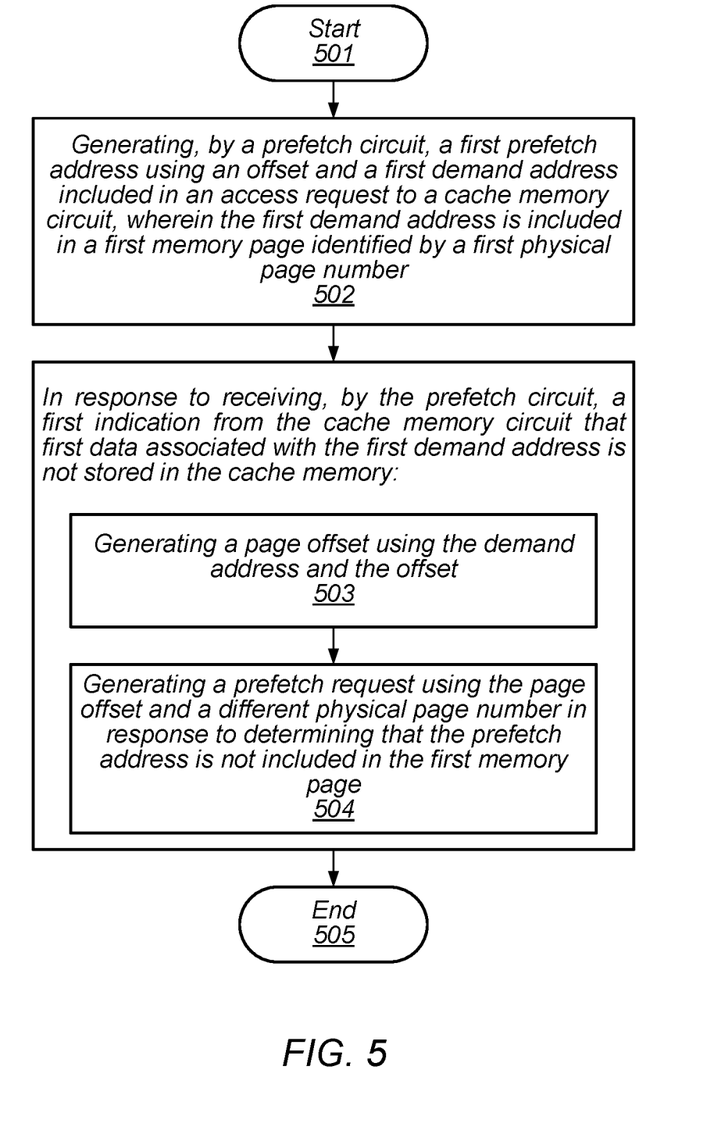
FIG. 5 is a flow diagram of an embodiment of a method for operating a prefetch circuit.

Turning to FIG. 5, a flow diagram depicting an embodiment of a method for operating a prefetch circuit is illustrated. The method, which may be applied to various prefetch circuits including, for example, prefetch circuit 200, begins at block 501.

The method includes generating, by a prefetch circuit, a first prefetch address using an offset and a first demand address included in an access request to a cache memory circuit (block 502). In various embodiments, the first demand address is included in a first memory page identified by a first physical page number.

The method further includes, in response to receiving, by the prefetch circuit, a first indication from the cache memory circuit that first data associated with the first demand address is not stored in the cache memory, generating a page offset using the demand address and the offset (block 503).

The method also includes, in response to receiving the first indication, generating a prefetch request using the page offset and a different physical page number in response to determining that the prefetch address is not included in the first memory page (block 504).

The method may, in some embodiments, also include generating, by the prefetch circuit, a second prefetch address using the offset and a second demand address received from the cache memory circuit. In various embodiments, the second address is included in a second memory page identified by a second physical page number. The method may further include, in response to receiving, by the prefetch circuit, a second indication from the cache memory circuit that second data associated with the second demand address is not stored in the cache memory circuit, generating a second prefetch request using the page offset and the second physical page number in response to determining that the second prefetch address is included in the second memory page.

In various embodiments, the method may also include performing a training operation using a plurality of virtual addresses corresponding to physical addresses included in a plurality of accesses to the cache memory circuit. The method can further include, in response to determining that a number of times a memory page boundary was crossed during the training operation exceeds a threshold value, activating, by the prefetch circuit, a cross page mode, and updating the offset using a result of the training operation.

In some embodiments, the method may also include, in response to determining the cross page mode is active and that a next physical page number is not stored in the prefetch circuit, sending a request to a translation lookaside buffer for a particular entry of a plurality of entries stored in the translation lookaside buffer, wherein the particular entry includes the next physical page number. The method may, in other embodiments, include incrementing the second physical page number to generate the next physical page number. In various embodiments, the method may include decrementing the second physical page number to generate the next physical page number. The method concludes in block 505.

Figure 6:
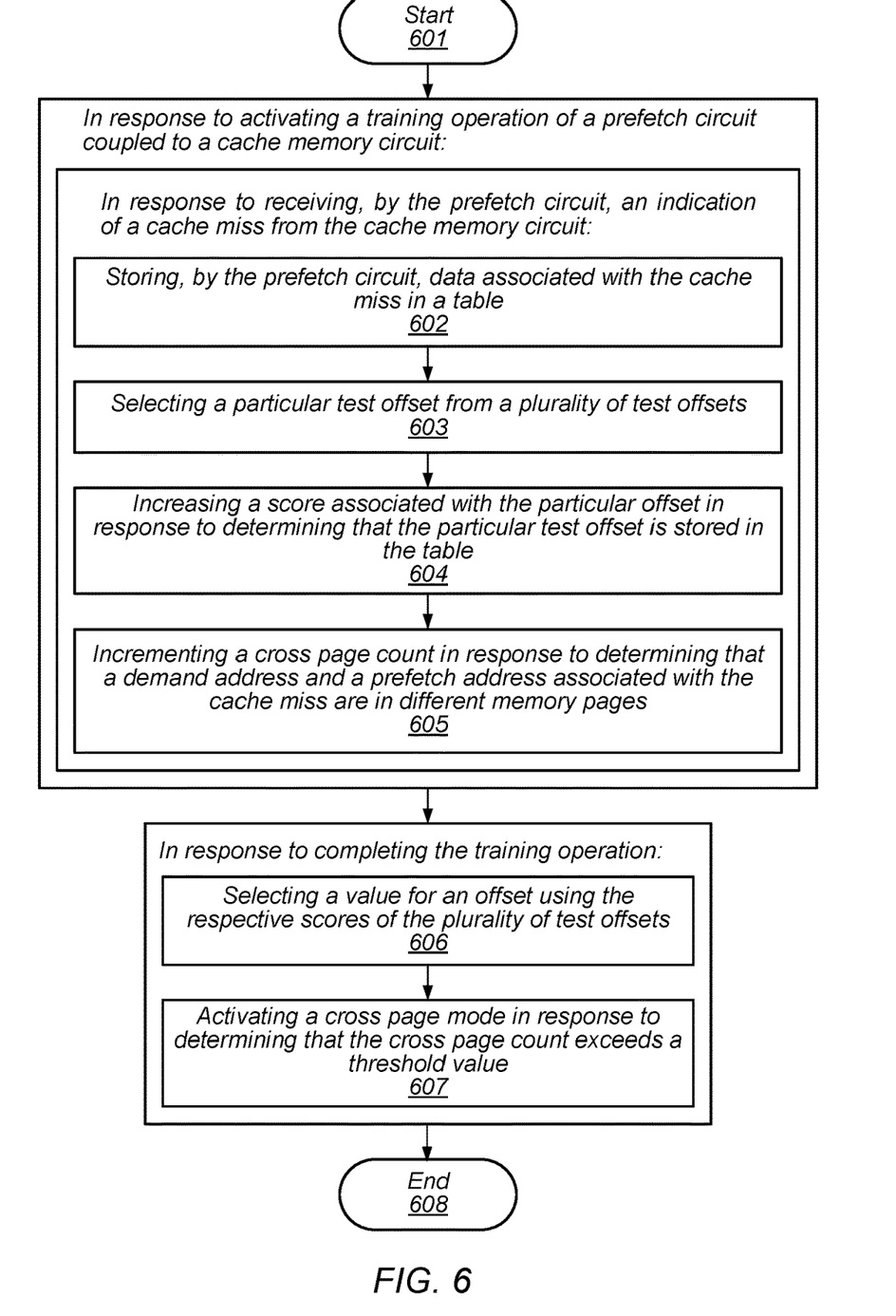
FIG. 6 is a flow diagram of an embodiment of a method for determining an offset for a prefetch circuit.

Turning to FIG. 6, a flow diagram depicting an embodiment of a training or learning operation for a prefetch circuit is illustrated. The method, which may be applied to various prefetch circuits, e.g., prefetch circuit 102, begins in block 601.

The method includes, in response to activating a training operation of a prefetch circuit coupled to a cache memory circuit and, in response to receiving, by the prefetch circuit, an indication of a cache miss from the cache memory circuit, storing, by the prefetch circuit, data associated with the cache miss in a table (block 602). In various embodiments, the training operation can be activated in response to various situations. For example, in some embodiments, the method may further include activating the training operation in response to determining that a particular time period has elapsed.

The method further includes, in response to receiving the indication of the cache miss, selecting a particular test offset from a plurality of test offsets (block 603). In various embodiments, selecting the particular test offset may be performed using a variety of selection algorithms. For example, in some embodiments, selecting the particular test offset may include determining a next test offset for a sequential list of the plurality of test offsets. In another embodiment, the method may also include initializing corresponding scores of the plurality of test offsets in response to activating the training operation.

In various embodiments, the method also includes, in response to receiving the indication of the cache miss, increasing a score associated with the particular offset in response to determining that the particular test offset is stored in the table (block 604). In various embodiments, the table includes a first way and a second way. The first way is configured to store a plurality of virtual addresses associated with a plurality of cache misses. The second way is configured to store a plurality of prefetch addresses associated with the plurality of cache misses.

The method further includes, in response to receiving the indication of the cache miss, incrementing a cross page count in response to determining that a demand address and a prefetch address associated with the cache miss are in different memory pages (block 605).

The method also includes, in response to completing the training operation, selecting a value for an offset using the respective scores of the plurality of test offsets (block 606). The training operation can be completed using a variety of techniques. In some embodiments, the method may include completing the training operation in response to determining the plurality of test offsets have been checked a threshold number of times. Alternatively, the method may include completing the training operation in response to determining that a particular test offset of the plurality of test offsets has been checked a threshold number of times.

The method further includes, in response to completing the training operation, activating a cross page mode in response to determining that the cross page count exceeds a threshold value (block 607). The method concludes in block 608.

Figure 7:
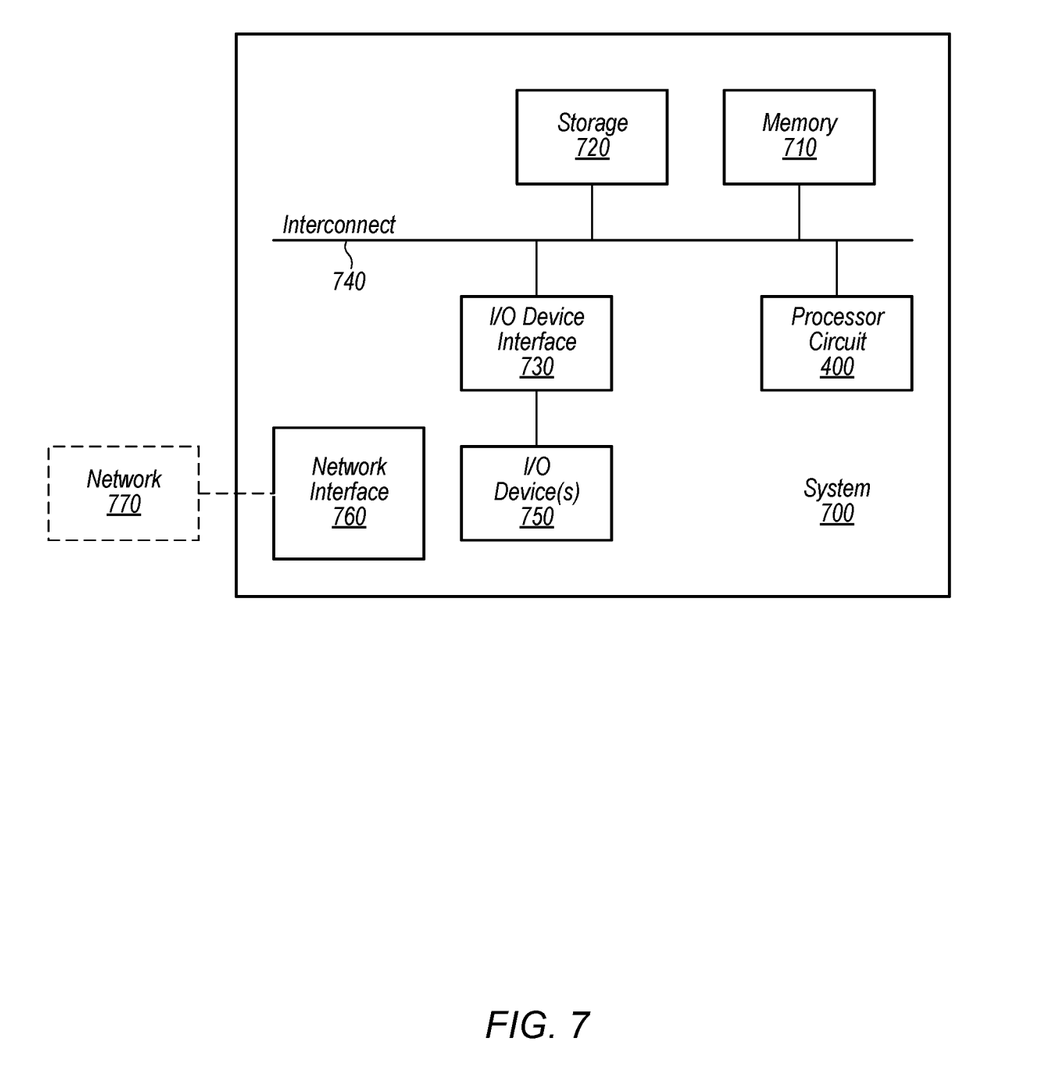
FIG. 7 is a block diagram of one embodiment of a computing device.

Processor circuit 400, described above with reference to FIG. 4, may be included within a variety of system configurations, one example of which is shown in FIG. 7. In various embodiments, system 700 may correspond to a general-purpose computer system, such as a desktop or portable computer, a mobile phone, or the like. System 700 may also correspond to any type of embedded system that may employ one or more instances of processor circuit 400 as a dedicated controller. For example, system 700 may correspond to any type of computer peripheral device such as a mass storage device or storage array, printer, or the like, as well as control systems for automobiles, aviation, manufacturing, and other suitable applications.

As shown, system 700 includes processor circuit 400, memory 710, storage 720, and input/output (I/O) device interface 730 coupled via interconnect 740. One or more I/O devices 750 are coupled via I/O device interface 730. System 700 also includes network interface 760 that may be configured to couple system 700 to network 770 for communications with, e.g., other systems. (In various embodiments, network interface 760 may be coupled to interconnect 740 directly, via I/O device interface 730, or according to a different configuration.) It is noted that some or all of the components of system 700 may be fabricated as a system-on-a-chip, although discrete combinations of components may also be employed.

Processor circuit 400 may include cache memory circuits and a prefetch circuit as disclosed above. Memory 710 may include random-access memory (RAM) of any suitable configuration, such as working memory configured to store data and instructions usable by processor circuit 400. Storage 720 may include mass storage devices such as magnetic, optical, or nonvolatile/flash memory storage, or a combination of these. In some embodiments, either of memory 710 or storage 720 may be omitted or integrated into the other as a single memory subsystem from the perspective of processor circuit 400.

I/O device interface 730 may be configured to interface between interconnect 740 and one or more other types of buses or interfaces. For example, interconnect 740 may correspond to the advanced high-bandwidth bus ("AHB") interface or another suitable type of high-bandwidth interconnect, and I/O device interface 730 may be configured as a bridge device that enables coupling of different types of I/O devices to interconnect 740. I/O device interface 730 may implement one or more interface protocols such as Universal Serial Bus, Firewire, or other suitable standards. I/O device(s) 750 may include any suitable type of storage, network interface, user interface, graphics processing, or other type of device. Network 770, if present, may be any suitable type of wired or wireless communications network, such as an Internet Protocol (IP) addressed local or wide-area network, a telecommunications network, or the like. Network interface 760, if present, may be configured to implement any suitable network interface protocol needed for communication with network 770.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit, and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement of such circuits/units/components with respect to each other and the manner in which they interact, form a microarchitectural definition of the hardware that is ultimately manufactured into an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements that may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in a scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a cache memory circuit configured to:
   store a plurality of lines associated with a corresponding plurality of addresses; and
   receive an access request that includes a demand address corresponding to data included in a particular memory page identified by a particular physical page number; and
a prefetch circuit including a storage circuit configured to store a plurality of virtual-to-physical map entries, wherein the prefetch circuit is configured to:
generate a prefetch address using the demand address and a page offset;
in response to receiving an indication from the cache memory circuit that a particular line associated with the demand address is not stored in the cache memory circuit, generate a prefetch request using a different physical page number in response to a determination that the prefetch address is not included in the particular memory page; and
wherein the prefetch circuit is further configured to:
perform a training operation using a plurality of virtual addresses corresponding to physical addresses included in a plurality of accesses to the cache memory circuit;
in response to a determination that a number of times a memory page boundary was crossed during the training operation exceeds a threshold value, activate a cross page mode that tracks a number of page boundary crossings during the training operation; and
update the page offset using a result of the training operation.

2. The apparatus of claim 1, wherein the prefetch circuit is further configured, in response to receiving the indication, to generate the prefetch request using the page offset and the particular physical page number in response to a determination that the prefetch address is included in the particular memory page.

3. The apparatus of claim 1, further comprising a translation lookaside buffer circuit configured to store a plurality of entries including a given entry that maps a given virtual page number to a given physical page number, and wherein the prefetch circuit is further configured, in response to the determination that the prefetch address and the demand address are both included in the particular memory page and in response to a determination that a cross page mode is active, to send a request to the translation lookaside buffer for a particular entry of the plurality of entries that includes the a next physical page number in response to a determination that the next physical page number is not stored in the storage circuit.

4. The apparatus of claim 1, wherein the prefetch circuit is further configured to increment the particular physical page number to generate the different physical page number.

5. The apparatus of claim 1, wherein the prefetch circuit is further configured to decrement the particular physical page number to generate the different physical page number.

6. A method, comprising:
generating, by a prefetch circuit, a first prefetch address using a first offset and a first demand address included in an access request to a cache memory circuit, wherein the first demand address is included in a first memory page identified by a first physical page number; and
in response to receiving, by the prefetch circuit, a first indication from the cache memory circuit that first data associated with the first demand address is not stored in the cache memory circuit:
generating a page offset using the demand address and the first offset;
generating a prefetch request using the page offset and a different physical page number in response to determining that the prefetch address is not included in the first memory page;
performing a training operation using a plurality of virtual addresses corresponding to physical addresses included in a plurality of accesses to the cache memory circuit;
in response to determining that a number of times a memory page boundary was crossed during the training operation exceeds a threshold value, activating, by the prefetch circuit, a cross page mode that tracks a number of page boundary crossings during the training operation; and
updating the page offset using a result of the training operation.

7. The method of claim 6, further comprising:
generating, by the prefetch circuit, a second prefetch address using the first offset and a second demand address received from the cache memory circuit, wherein the second demand address is included in a second memory page identified by a second physical page number; and
in response to receiving, by the prefetch circuit, a second indication from the cache memory circuit that second data associated with the second demand address is not stored in the cache memory circuit, generating a second prefetch request using the page offset and the second physical page number in response to determining that the second prefetch address is included in the second memory page.

8. The method of claim 6, further comprising, in response to determining that the cross page mode is active and that a next physical page number is not stored in the prefetch circuit, sending a request to a translation lookaside buffer for a particular entry of a plurality of entries stored in the translation lookaside buffer, wherein the particular entry includes the next physical page number.

9. The method of claim 8, further comprising incrementing the second physical page number to generate the next physical page number.

10. The method of claim 8, further comprising decrementing the second physical page number to generate the next physical page number.

11. The method of claim 6, wherein generating the prefetch request using the page offset and the different physical page number includes retrieving the different physical page number from a storage circuit included in the prefetch circuit.

* * * * *